Patented Mar. 6, 1945

2,370,961

UNITED STATES PATENT OFFICE 2,370,961

PREPARATION OF α-d-GALACTURONIC ACID

Charles S. Hollander, Philadelphia, Pa., assignor to Röhm & Haas Company, Philadelphia, Pa., a corporation of Delaware No Drawing. Application November 15, 1941,
Serial No. 419,313

3 Claims. (Cl. 195—32)

This invention relates to the preparation of α-d-galacturonic acid from pectin by the use of ferments obtained from the growth of fungi on nutrient media, such as wheat or rice bran, wheat, middlings, or soya bean meal.

Heretofore, pectic substances have been converted to galacturonic acid by acid hydrolysis. Such a method, however, tends to promote decomposition, even to the evolution of carbon dioxide, and to produce by-products which hinder the separation and purification of the desired acid. The preparation of galacturonic acid by alkaline saponification induces similar complications in the separation of a pure product. It has also been proposed to hydrolyze pectin to pectic acids and act on these with enzymes. This method still suffers from the difficulties resulting from chemical attack of the initial material.

It is now found that pectin may be converted to galacturonic acid in a readily crystallizable form without previous treatment with alkalies or acids by digesting pectin with pectic ferments resulting from the growth of fungi on nutrient media.

The pectin used may be obtained from fruits or vegetables. The usual commercial pectins are prepared from citrus fruits or from apples, and these are particularly satisfactory for the preparation of galacturonic acid by the process disclosed herein.

The pectic ferments which are effective are prepared by the action of mold fungi on the usual nutrient media for molds, particularly nutrient media fortified with added pectin. The medium may be liquid or solid. If liquid, the fungi may be grown and the liquid then used as the enzyme system or, after proper growth has taken place, the liquid may be concentrated or dried. Also, the enzymes may be isolated by precipitating them from solution by addition of salts or organic solvents, such as alcohol. In the case of a solid medium, the enzymic material may be extracted and the extract used directly or concentrated.

Suitable for the production of pectic ferments, the may be mentioned such fungi as *Penicillium glaucum*, *Aspergillus niger*, *Aspergillus flavus*, *Aspergillus oryzae*, *Aspergillus fumigatus*, *Aspergillus parasitians* type, *Aspergillus tamari* type, *Aspergillus wentii*, *Rhizopus tritici*, *Rhizopus nigricans*. These fungi, as well as other similar molds, yield enzyme systems which are effective in this invention. These systems apparently contain both polygalacturonases and esterases.

A particularly effective enzyme system is commercially available in the material called "Pectinol AP." This commercial enzyme preparation is obtained by the growth of molds on nutrient media which contain pectin, followed by extraction with water, and precipitation of the enzyme system from the water extract by addition of alcohol.

To utilize the above-described ferments for the preparation of galacturonic acid, pectin is first taken up in water, preferably by heating together water and pectin and then cooling to form a solution or gel, to which is then added the enzymic material. The resulting mixture is held between 15° C. and 45° C., preferably between 35° C. and 40° C., until the iodine number of the solution becomes constant. For this determination, the iodine reduction method of Willstäter and Schudel is recommended. The solution is then concentrated by evaporation of water, desirably under reduced pressure, and a water-miscible organic solvent added to the concentrate. As such solvent, there may be used methyl alcohol, ethyl alcohol, isopropyl alcohol, acetone, or the like. The addition of solvent permits separation of galacturonic acid and gummy residue, as by filtration or decantation. It is desirable at this point to treat the solvent-water solution with charcoal to remove color. The solution is then concentrated to a syrup and left to crystallize. Crystallization is preferably allowed to proceed slowly, and two days is a convenient time for this operation. A semi-solid mass results. This is readily handled by triturating with an organic solvent, such as 90% ethanol, to permit ready pouring and handling. Mother liquor and crystals are separated, by filtration or other suitable operation, such as centrifuging, and the crystals dried. This product may be recrystallized if desired.

The preferred procedure is amplified by the following example:

1500 ml. of tap water was heated to about 90° C. in a double boiler, and 150 grams of powdered citrus pectin was gradually stirred into the water with a small power beater. A viscous, but homogeneous, solution resulted. Stirring was continued while the solution was cooled. When the temperature reached 40° C., a slurry of 1 gram of "Pectinol AP," a commercial enzyme preparation, in 20 ml. of cold water was stirred in and the mixture allowed to stand. In about an hour, the viscosity of the solution became markedly less, and the solution was poured into a container, 1 gram of toluene added as a preservative, and the container placed in a room maintained between 37° C. and 40° C. Within one day, the viscosity approached that of water and insoluble material settled out. Samples of the solution were titrated with iodine from time to time, and, when the iodine number became constant, the solution was concentrated under reduced pressure until it weighed 375 grams. It was then warmed to 60° C. and 1 liter of absolute alcohol mixed therewith. The insoluble materials were permitted to settle, the clear liquid decanted, and the remaining sludge washed twice with alcohol by decantation. The decanted wash liquor was chilled and left standing to effect more complete removal of insoluble gummy material. The clear solutions were then combined, treated with 20 grams of activated charcoal, and filtered. The filtrate was concentrated under greatly reduced pressure to about 150 grams, seeded, and chilled. In twenty-four hours, a nearly solid mass of crystals had formed. The mass was broken up and triturated with 100 ml. of 90% ethanol and left in the cold for another twenty-four hour period. The crystals were then freed from mother liquor on a suction filter, washed with another 100 ml. portion of 90% alcohol, and dried in a vacuum desiccator over calcium chloride. The yield of primary product was 68 grams of nearly white α-d-galacturonic acid. From mother liquor and washings, a further small amount of this acid was recovered.

Upon recrystallization of the products from alcohol, with an additional carbon treatment, a product was obtained which corresponded by analysis to $C_6H_{10}O_7 \cdot H_2O$.

The above preparation was repeated with pectin from apple pomace. A similar pure product was obtained, but in a yield of 45 grams.

The discovery that galacturonic acid may be prepared directly from pectin by treatment thereof with the enzyme systems resulting from mold growths on nutrient media with subsequent separation of gelatinous materials and crystallization of the desired acid has greatly simplified the production of galacturonic acid. It has eliminated acid or alkali treatments and tedious steps for removal of these materials and undesirable decomposition products. It has improved the yield and given a means of obtaining a highly pure crystalline acid, which is useful in the preparation of pharmaceuticals.

I claim:

1. The process of preparing α-d-galacturonic acid from pectin which consists of acting on a pectin solution with a preparation of pectic enzymes from mold growth on nutrient media until a constant iodine number is obtained, concentrating the digested pectin solution, extending the concentrated solution with a water-miscible organic solvent, separating from the resulting solution any material insoluble therein, concentrating the clarified solution, and crystallizing therefrom the galacturonic acid.

2. The process of preparing α-d-galacturonic acid from pectin which consists of acting on a solution of citrus pectin with pectic enzymes obtained by the growth of mold on nutrient media containing pectin, concentrating the digested pectin solution, extending the concentrated solution with ethyl alcohol, separating from the resulting solution any material insoluble therein, concentrating the clarified solution thus obtained, and crystallizing from the concentrated solution the galacturonic acid.

3. The process of preparing α-d-galacturonic acid from pectin which consists of acting on a pectin solution with a preparation of pectic enzymes from mold growth on nutrient media until a constant iodine number is obtained, concentrating the digested pectin solution, extending the concentrated solution with a water-miscible organic solvent, and separating from the resulting solution any material insoluble therein.

CHARLES S. HOLLANDER.